UNITED STATES PATENT OFFICE.

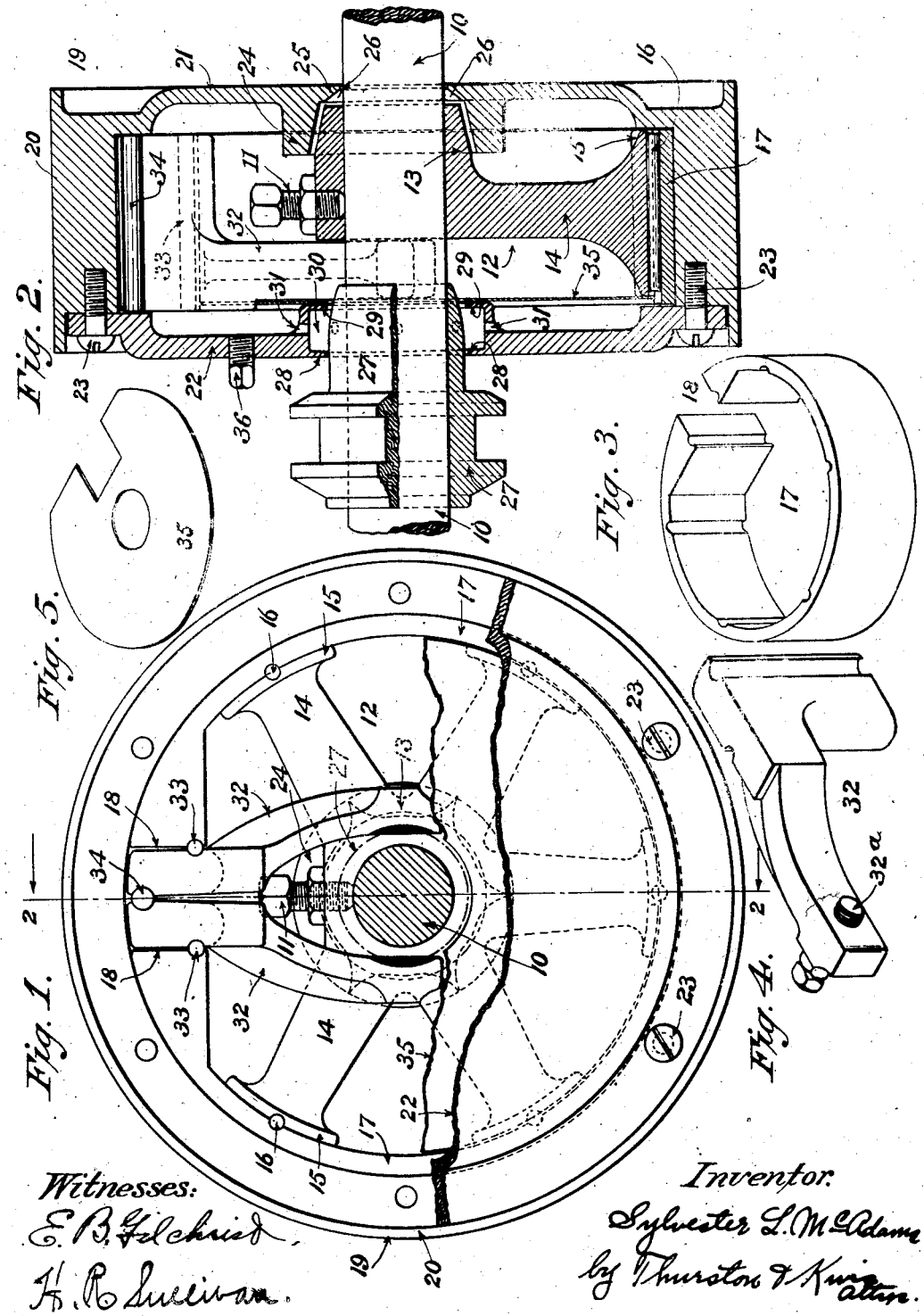

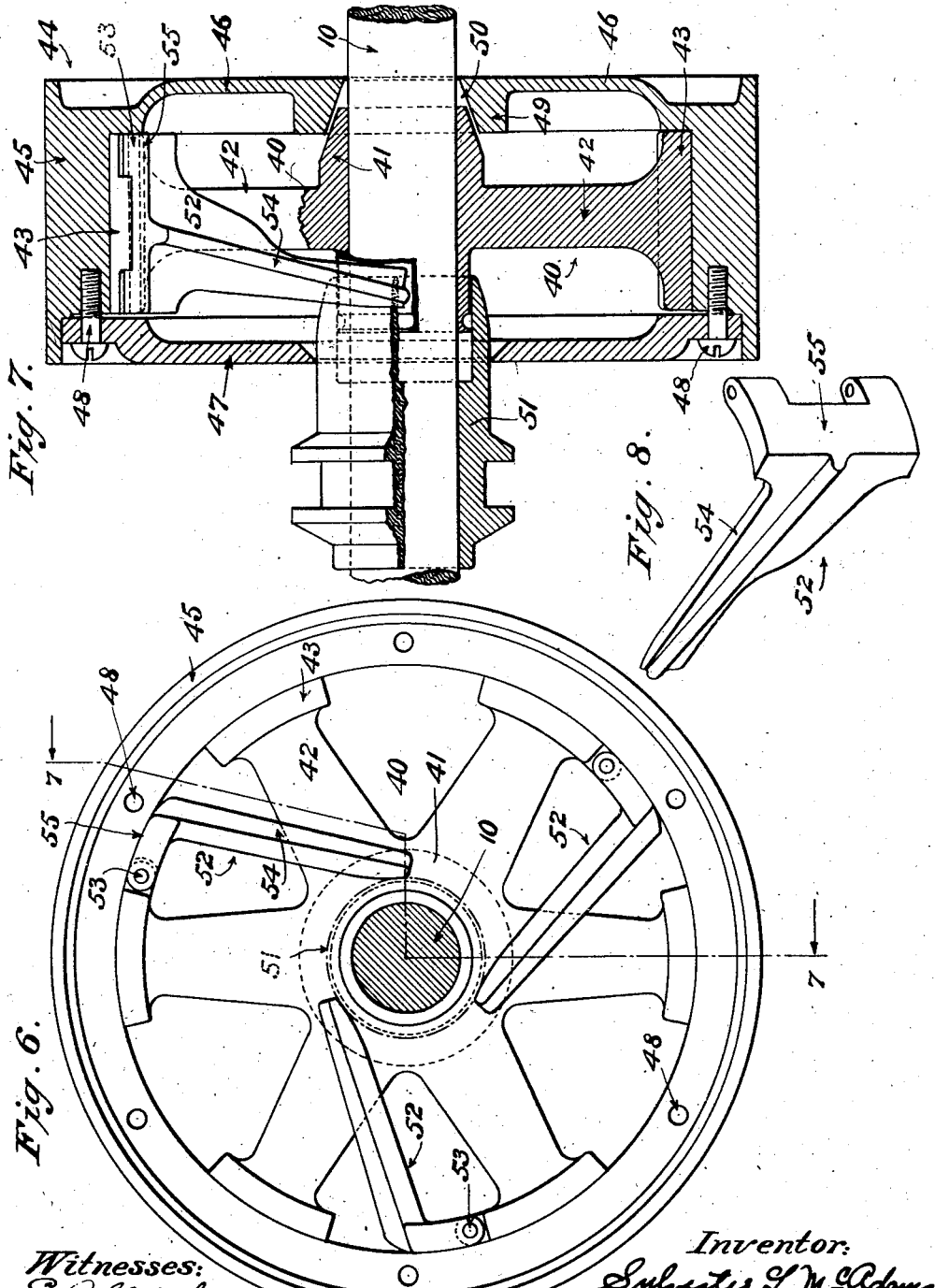

SYLVESTER L. McADAMS, OF CLEVELAND, OHIO, ASSIGNOR TO THE HALE-McADAMS WHEEL COMPANY, OF CLEVELAND, OHIO, A CORPORATION OF OHIO.

COMBINED LOOSE PULLEY AND CLUTCH.

1,011,355.  Specification of Letters Patent.  Patented Dec. 12, 1911.

Application filed October 12, 1910. Serial No. 586,591.

*To all whom it may concern:*

Be it known that I, SYLVESTER L. MC-ADAMS, a citizen of the United States, residing at Cleveland, in the county of Cuyahoga and State of Ohio, have invented a certain new and useful Improvement in Combined Loose Pulleys and Clutches, of which the following is a full, clear, and exact description.

This invention relates to combined loose pulleys and clutches and has for its object the provision of a device of the character stated, which is simple in construction, efficient both as a clutch and loose pulley, is constructed particularly with a view of improving the lubrication of the bearing surfaces, and which requires very little personal attention to keep the working parts at all times well lubricated and in good working condition.

My invention in its broad aspect comprises a combined loose pulley and clutch including a spider or hub portion which is fixed to the shaft and a pulley which is in the form of an oil inclosure or container to which a quantity of oil or other lubricant is adapted to be supplied and which is supported or has a bearing at the outer portion of the spider, either on the outer ends of the spider arms or on a member carried by them, so that when the pulley is rotating freely on the spider, the bearing surfaces are in the medium of the oil which is thrown outwardly by centrifugal force and further the pulley or inclosure is constructed especially with a view of preventing oil from escaping along the surface of the shaft, the oil which is thrown inwardly to the shaft being thrown outwardly again toward the periphery of the pulley before it can escape through the shaft openings in the sides of the pulley. The oil is thrown back to the interior of the pulley so as to cause a complete circulation by the particular construction of the sides or side walls, as will be explained.

The specific form of clutching mechanism may be varied somewhat, but by means of a sleeve and suitable clutch fingers which are engaged thereby, clutching device or devices carried by the outer portion of the spider may be forced against the inner periphery of the pulley rim so as to cause the pulley and the spider to be driven in unison. In one form of my invention, the clutching means comprises an expansible ring which is carried by the ends of the spider arms and normally serves as a bearing for the pulley but is designed to be spread or expanded by the sleeve and spreading fingers engaged thereby so as to tightly engage or clutch the inner surface of the pulley rim. In another form of this part of my invention, the pulley bears directly on the outer ends of the spider arms and is designed to be clutched to the spider by clutching members which are carried by the spider arms and are adapted to be shifted, as in the first case, by means of an axially moving sleeve on the shaft.

The pulley consists of a rim and inwardly extending sides which are closed except for the shaft openings which are slightly larger than the shaft so that the edges or peripheries of the openings are out of engagement with the shaft. The side portions of the pulley adjacent the shaft openings are provided with means for preventing any escape of oil from the inclosure through the openings or along the surface of the shaft.

My invention may be further briefly summarized as consisting in certain novel details of construction and combinations and arrangements of parts to be described in the specification and set forth in the appended claims.

In the figures of the drawings, Figure 1 is a side elevation of one form of combined loose pulley and clutch, portions being broken away for the sake of clearness; Fig. 2 is a vertical sectional view of the same; Fig. 3 is a perspective view of an expansible clutch ring and bearing member for the loose pulley, shown on a slightly reduced scale; Fig. 4 is a perspective view of one of the clutch fingers or arms which coöperate with the sleeve to spread the expansible ring; Fig. 5 is a similar view of an oil guard plate which is fitted on the interior of the pulley on one side of the spider and clutch ring, the plate being shown on a reduced scale; Fig. 6 is a side view with one side plate removed of a modified form of the invention; Fig. 7 is a sectional view substantially along the irregular line 7—7 of Fig. 6 looking in the direction indicated by the arrows; and Fig. 8 is a perspective view of one of the clutch members carried by the outer end of the spider.

Referring now to the figures of the drawing and first to the modification shown in Figs. 1 to 5, 10 represents a portion of the shaft to which is secured by means of a set screw 11 the hub portion or spider 12 of the combined loose pulley and clutch. This spider may, of course, be constructed in various ways, but in this case it is provided with an inner hub 13 which projects in this case in the one direction only for a purpose to appear later, and radial heads 15, the outer surfaces of which are turned concentrically with respect to the axis of the shaft. Connected to the heads 15 of the spider arms 14, in this case by pins 16, is an expansible ring 17 which serves as a bearing for the pulley, and forms part of the clutch mechanism which clutches the spider and pulley together. This ring 17 is split or divided at 18, the free ends of the ring being spaced a short distance apart and being thickened or enlarged, as shown. It will be noted that the pins 16 which connect the expansible ring 17 with the spider engage partly within the heads 15 of the spider and partly within the ring, so that while they form the driving connection between the spider arms and the ring, they permit the ring to be expanded by means to be referred to presently, and then to contact so that the pulley may rotate on said ring. The pulley, which is designated as a whole by the reference character 19, is in the form of an oil reservoir or container and forms an inclosure for the oil and the bearing and working parts. This pulley or inclosure 19 includes a rim portion 20, the outer periphery of which is adapted to be engaged by a belt, or other driving means, and the inner periphery or surface of which is adapted to either turn loosely on the outer surface of the ring 17 to be clutched to the spider by said ring. The pulley also includes side portions 21 and 22, the former being in this case integral with the rim and the latter being in the form of a removable plate or disk which is normally fastened to the rim by means of screws 23. The plate 21 extends inwardly about the shaft and has a shaft opening which is slightly larger than the shaft so that it will not engage the same. This side plate 21 is provided on its inner side and near the shaft with a lateral flange or hub 24 which surrounds and is spaced from the hub 13 of the spider and the inner surface of which is inclined inwardly and away from the shaft. The plate 21 is also provided between this flange 24 and the shaft with an inwardly extending flange 25 having the shaft opening previously referred to, and beveled or inclined inwardly and away from the shaft, leaving between it and the end of the spider hub an annular oil recess 26, from which the oil is adapted to be thrown by centrifugal force outwardly along the beveled face of the flange 25. The opposite side portion or side 22 is provided with a centrally located opening slightly larger than the shaft opening in the side portion 21, this opening being large enough to accommodate the clutch sleeve 27 which is adapted to be slid axially on the shaft and to have its inner end enter the oil inclosure and is provided about the sleeve 27 or at its inner periphery with two annular inwardly projecting flanges 28 and 29, the inner edges of which surround the sleeve 27, but are not to be in actual engagement therewith. Between these flanges 28 and 29 is an annular oil recess or pocket 30 from which oil is adapted to escape or be thrown back into the interior of the inclosure through oil return openings 31 which communicate with the annular recess 30. The expansible clutch and bearing ring 17 is adapted to be spread so as to clutch the spider and pulley together by means of the sleeve 27 as previously referred to and by means of a pair of clutch fingers or arms 32 having outer end portions which extend into the opening 18 between the free ends of the ring 17 and inwardly extending portions which extend on opposite sides of the shaft and are adapted to be engaged and spread apart by the tapered inner end of the sleeves 27. These arms 32 are loosely or pivotally connected to the enlarged free ends of the ring 17 by means of pins 33 which engage partly within the ends of the ring and partly in the fingers 32. Also the outer ends of the fingers 32 bear upon a pin 34 which is engaged between said fingers and constitutes a fulcrum about which said fingers move when the ring is being spread, the pins 33 moving outwardly or away from each other so as to spread the ring by this movement of the fingers. The arms 32 may be provided at their inner ends with set screws 32$^a$ which may be adjusted to take up any wear between the ring and the pulley rim. Although the construction of the side portions of the pulley about the shaft and sleeve 27 in such that oil cannot escape along the shaft or sleeve for the reasons to be referred to presently, I prefer to employ as an additional safeguard against the escape of oil at the sleeve opening a substantially circular plate or guard 35 which is arranged on the interior of the pulley at the side which is entered by the sleeve and has a shape such that it fits closely into the expansible ring and moves therewith. This plate 35 is provided with a central opening slightly larger that the sleeve 27 so as not to interfere with the free movement of the latter. The function of this plate 35 is to assist in the prevention of the loss or escape of oil along the surface of the sleeve due to splashing or churning of oil in the inclosure. Normally or when the ring 17 is not expanded, the pulley turns loosely on the outer surface of the ring, the adjacent surfaces of the ring and pulley being very effectively lubricated by the oil which is supplied to the inclosure through an oil opening normally closed by a plug 36. A satisfactory and continued lubrication is assured and frictional losses are minimized because of the fact that the bearing surfaces, instead of being at the shaft, are at the outer portion of the spider, or in the midst of the oil which is thrown outward by centrifugal force to the inner periphery of the pulley rim. To clutch the spider and pulley together, the sleeve 27 is moved inward, thereby spreading the inner portions of the fingers 32 and expanding the ring 17 so as to cause practically all portions of its outer surface to bear against and grip the inner surface of the pulley rim, with the result that the pulley and spider are clutched together with little danger of relative slipping. The escape of oil through the shaft openings in the side portions of the pulley is prevented in a very effective manner, while the device is used either as a loose pulley or as a clutch by the particular construction about the shaft openings. Any oil which enters the oil recesses 26 and 30 about the shaft 10 and sleeve 27 respectively is thrown outwardly or away from the shaft into the inclosure along the inclined surfaces of the flanges 25 and 24 on one side of the pulley and through the oil return openings 31 which communicate with the recess 30. By providing clearance spaces of the proper amount between the sides of the pulley and the shaft and sleeve respectively, the oil which tends to pass outwardly along the shaft attaches itself to the sides and is then returned to the outer portion of the inclosure in the manner above stated, and the escape of oil is prevented much more effectively than if the sides of the pulley bear on the shaft or sleeve.

In the modification shown in Figs. 6, 7 and 8, the pulley and clutch includes an oil inclosure, and the bearing surfaces of the device when serving as a loose pulley are located at the outer portion of the spider or in the midst of the oil, as in the construction first described. In these figures, the spider which is designated as a whole by the reference character 40, includes a hub 41 which may be secured to the shaft 10 in any suitable manner and arms 42 provided at their outer ends with enlargements 43 which are turned concentrically with respect to the axis of the shaft. The pulley which is designated as a whole by the reference character 44 includes a rim portion 45, the inner surface of which is normally supported and has a bearing, in this case, directly on the outer ends 43 of the spider arms. The pulley also includes side portions 46 and 47, the former being integral with the rim and the latter being in the form of a disk or plate which is secured to the rim by screws 48. The side 46 of the pulley is provided on the inner side and near the shaft with a boss or flange 49 which has a shaft opening slightly larger than the shaft 10, and tapers inwardly and away from the shaft, the inner portion of the flange 49 overhanging but being spaced from the hub of the spider and there being an annular oil pocket or recess 50 between the end of the spider and the outer portion of the shaft opening. The side 47 of the pulley has a shaft opening larger than the opening in the side 46 so that it may accommodate a clutch sleeve 51 which is similar to the sleeve 27 of the first construction and is designed to enter the side of the pulley. There is a slight clearance between the outer surface of the sleeve and the edge of the opening in the side 47, and the inner edge or periphery of the side 47 adjacent the sleeve is tapered inwardly and away from the sleeve. By providing tapered constructions at the inner portions of the sides 46 and 47, and by leaving small clearance spaces between these sides and the shaft and sleeve respectively, oil which would tend to pass outward along the shaft and sleeve, attaches itself to the inclined or beveled surfaces and is then thrown to the interior of the inclosure by the revolving pulley. In this manner, the escape of oil is prevented. Normally, the pulley turns loosely on the outer ends of the spider arms and although large bearing surfaces are provided, as in the first case, the frictional losses are very small, in view of the fact that the bearing surfaces are located in the midst of the oil when the pulley is in rotation. The pulley and spider are designed to be clutched together in this instance by means of the sleeve 51, and by means of a number of L-shaped fingers or levers 52 which are pivoted by pins 53 to extensions on the heads 43 of part of the spider arms, these fingers having inwardly projecting portions 54 which are normally located adjacent the spider hub and are designed to be engaged and spread by the sleeve 51 and portions 55 which are adapted to be moved outwardly so as to tightly engage the inner surface of the pulley rim so as to cause the pulley rim and spider to be clutched together. It will be seen therefore that the particular form of clutching means may be varied considerably, while still employing the main feature of the invention which includes the self-oiling combined clutch and pulley in the form of an oil inclosure with the bearing surfaces at the outer portion of the spider where the parts will be well lubricated by the oil thrown outwardly by centrifugal force, together with means for clutching the spider to the inner periphery of the pulley rim.

Having thus described my invention, what I claim is:—

1. In combination with a shaft, a combined clutch and loose pulley comprising a pulley and an annular member fixed to the shaft and designed to loosely support the pulley when running as a loose pulley, or to be clutched thereto, said pulley including a rim and side walls which extend inwardly toward the shaft so as to form with the rim an inclosure adapted to contain a quantity of oil, the inner face of the rim constituting the bearing surface of the pulley which is lubricated when turning loosely on said member by the oil which is thrown outwardly by centrifugal force, and clutching means carried by said annular member and adapted to be moved outward so as to engage the inner face of the rim.

2. In combination with a shaft, a combined clutch and loose pulley comprising a pulley and an inner member fixed to the shaft and serving as a bearing to loosely support the pulley at the rim thereof or to be clutched thereto, said pulley including a rim and inclosing side walls forming a chamber adapted to contain a quantity of oil which is thrown outwardly by centrifugal force, when the pulley is in rotation, onto and between the bearing surfaces, and means carried by said inner member adapted to be moved outwardly so as to frictionally engage the inner face of the pulley rim and thereby clutch the pulley and inner member together.

3. In combination with a shaft, a combined clutch and loose pulley comprising a pulley and spider designed to loosely support the pulley at the rim thereof and be clutched thereto, said pulley including a rim and inclosing side walls forming a chamber adapted to contain a quantity of oil, the inner face of the pulley rim constituting the bearing surface of the pulley which is therefore lubricated by oil thrown outwardly by centrifugal force, the side walls of the pulley having openings through which the shaft loosely extends without engaging the side walls and provided at said openings about the shaft with means for collecting the oil which tends to pass through said openings and for causing the same to be thrown to the interior of the chamber by centrifugal force, and clutching means carried by said spider adapted to be moved outwardly so as to engage the inner face of the pulley rim.

4. In combination with a shaft, a combined clutch and loose pulley comprising a pulley, and a spider designed to loosely support the pulley and to be clutched thereto, said pulley including a rim and side walls which form with the rim a chamber adapted to contain a quantity of oil, the inner face of the rim forming the bearing surface for the pulley which is lubricated when turning loosely on the spider by the oil which is thrown outwardly to the rim by centrifugal force, the side walls of the pulley having openings through which the shaft loosely extends and being provided about the shaft with inwardly extending flanges, means for clutching the spider and pulley together comprising clutching means carried by the spider and adapted to engage the inner face of the pulley, and a clutch sleeve on said shaft extending into the opening in one side of the pulley and adapted to actuate said clutching means.

5. In combination with a shaft, a combined clutch and loose pulley comprising a spider which is fixed to the shaft, and a pulley, in the form of an oil inclosure adapted to contain a quantity of oil and comprising a rim and closing side walls provided with openings through which the shaft loosely extends, the pulley being supported solely by said spider and having a bearing surface on the inner face of the rim, means for clutching the spider and pulley together comprising clutching means carried by the spider and adapted to engage the inner face of the pulley rim, and a sleeve which loosely enters the opening in one of the side walls and actuates the clutching means, one of the side walls having at its inner periphery an annular inwardly extending portion which is adjacent to the shaft, and the other side wall having an annular inwardly extending portion which is adjacent to the sleeve, said portions serving to stop the outward passage of oil along the surfaces of the shaft and sleeve respectively, and to return the oil into the inclosure.

In testimony whereof, I hereunto affix my signature in the presence of two witnesses.

SYLVESTER L. McADAMS.

Witnesses:
 H. R. SULLIVAN,
 A. F. KWIS.